United States Patent [19]

McCann

[11] Patent Number: 4,531,171

[45] Date of Patent: Jul. 23, 1985

[54] BIDIRECTIONAL BRUSH PRESSURE SOURCE FOR MAGNETIC READ/WRITE HEADS

[75] Inventor: John C. McCann, La Mesa, Calif.

[73] Assignee: Cubic Western Data, San Diego, Calif.

[21] Appl. No.: 597,507

[22] Filed: Apr. 6, 1984

[51] Int. Cl.³ .............................................. G11B 15/60
[52] U.S. Cl. ................................................ 360/130.3
[58] Field of Search ........... 360/130.3, 130.31, 130.32, 360/130.33, 128, 66, 88, 108, 102, 103, 109, 2, 61, 69; 226/53; 271/51; 235/449, 483, 486, 493

[56] References Cited

U.S. PATENT DOCUMENTS

| | | | |
|---|---|---|---|
| 3,218,440 | 11/1965 | Albosta | 360/130.3 |
| 3,949,424 | 4/1976 | Jollyman | 360/2 |
| 4,062,050 | 12/1977 | Shigemori | 360/69 |

Primary Examiner—Robert M. Kilgore
Attorney, Agent, or Firm—Brown, Martin & Haller

[57] ABSTRACT

A read/write head for reading and writing data on a magnetic card or ticket with drive means for driving the ticket back and forth in opposite directions past the head includes a ticket pressure biasing unit in the form of a pair of brushes disposed adjacent head and inclined slightly toward one another in a direction toward the head for applying a uniform pressure on a ticket moving past the head in either direction of the ticket.

12 Claims, 5 Drawing Figures

BIDIRECTIONAL BRUSH PRESSURE SOURCE FOR MAGNETIC READ/WRITE HEADS

BACKGROUND OF THE INVENTION

The present invention relates to automatic fare collection systems and relates particularly to read/write head assembly.

Automatic fare collection systems typically utilize high-speed transport units for accepting a magnetic ticket or card and transporting the ticket or card rapidly in one or both directions past a magnetic read/write head. In order to insure accuracy of the reading and writing on the ticket or fare card, it is essential that the card or ticket be positioned in a uniform position with uniform pressure against the read/write head. The principal biasing means for tickets in the past have been rollers positioned opposite the magnetic head for biasing the ticket into engagement with the head. Rollers, however, require very accurate and minute adjustments to maintain necessary pressure and clearance of the card against the magnetic read/write head.

Another way of applying pressure to the fare card which has been utilized by the assignee hereof in the past is to use a set of angularly inclined bristles made of a material such as nylon angled in the direction of movement of the card for biasing the card against the magnetic head. Such brush assemblies have been inclined only slightly from the path of the moving ticket or fare card and point in the direction of movement of the card. Such brush systems work very well where the card travels only in a single direction with the brush bristles pointing in that direction. However, recent systems utilize a reversing transport which reverses and transports the card back across the read head in the opposite direction. The typical brush pressure unit as used in the past will tend to buckle, and cause sudden changes in the speed of the fare card which can result in errors in reading or writing data. In addition, where unidirectional bristles are used, if the direction of the fare card is reversed, the proper amount of pressure of the fare card against the magnetic head may not be achieved.

It is therefore desirable that an improved pressure unit be available for magnetic read/write heads.

SUMMARY AND OBJECTS OF THE INVENTION

It is the primary object of the present invention to provide an improved pressure unit for a magnetic read/write head.

In accordance with the primary aspects of the present invention, a pressure unit for bidirectional movement of a fare card across a magnetic read/write head includes bidirectional pressure brush means positioned adjacent said head for biasing a ticket against said transducer with uniform pressure during movement in either direction past the head.

BRIEF DESCRIPTION OF THE DRAWINGS

The above and other objects and advantages of the present invention will become apparent from the following description when read in conjunction with the drawings wherein.

DESCRIPTION OF PREFERRED EMBODIMENT

Figure 1:
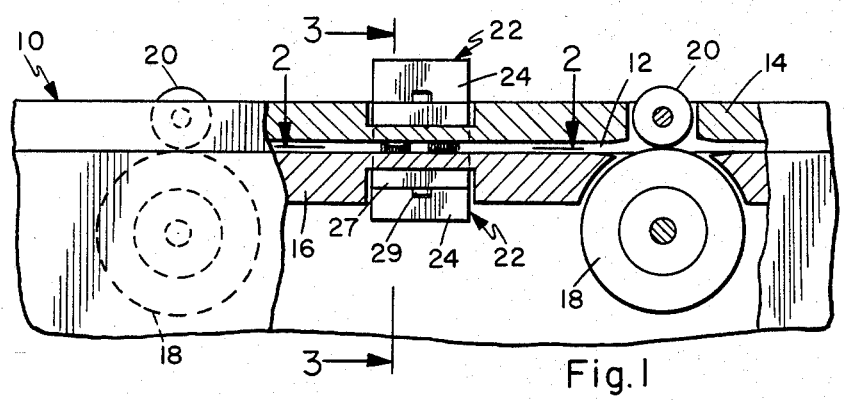
FIG. 1 is a side elevation view of a portion of a ticket transport, with portions cutaway to show the brush and head installation.

Referring to FIG. 1 of the drawing, there is illustrated a simplified form of a transport unit designated generally by the numeral 10 of an automatic ticket vending machine incorporating a head assembly and pressure unit in accordance with the invention. The transport unit is designed to rapidly reciprocate or pass a ticket past one or more magnetic read/write heads for either reading or writing on the ticket. In a typical vending machine for tickets and the like, such a transport unit would pass a ticket in one direction for encoding the ticket with the proper amount, etc. and quickly stop and reverse the ticket, moving it past the head in the opposite direction for verifying the ticket before it is dispensed to the vendee. Other installations may accept a ticket in a transport unit which passes the ticket one direction for verifying an adequate amount of fare and stopping and reversing the ticket, moving it in the opposite direction for cancelling the selected amount of fare. Other functions may also be performed on the card as it passes the head.

In the illustrated embodiment, a ticket passage 12 is formed between upper plates 14 and 16 with a ticket drive or transport roller 18 intersecting the passage 12 and a pinch roller 20 above and engaging the drive roller for engaging and gripping the ticket therebetween. Since the plates in the illustrated embodiment are identical, identical reference numerals will be utilized and only a single unit will be specifically described. Similarly, in the illustrated embodiment, a double head assembly is illustrated and only one will be described in detail with like parts being identified by the same reference numeral.

In the illustrated embodiment, upper and lower magnetic head assemblies designated generally by the numeral 22 are illustrated. Each head assembly includes a housing member 24 in which is appropriately mounted a magnetic head unit 26. The housing unit 24 is adapted to be secured by flanges 27 with cap screws 29 to the transport unit. Each of the head assembly units includes a pressure brush unit in accordance with the invention which is positioned within the housing unit to one side of the recording head for engaging the oppositely positioned recording or magnetic head.

Figures 2, 4, 5:
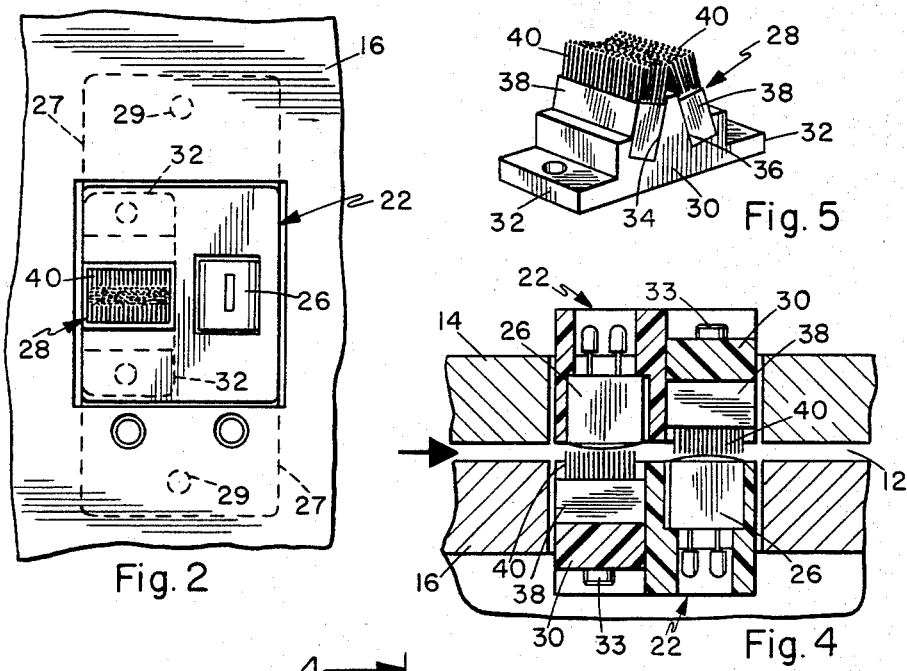
FIG. 2 is an enlarged sectional view taken on line 2—2 of FIG. 1.
FIG. 4 is a sectional view taken on line 4—4 of FIG. 3.
FIG. 5 is a perspective view of the brush pressure element.
Figure 3:
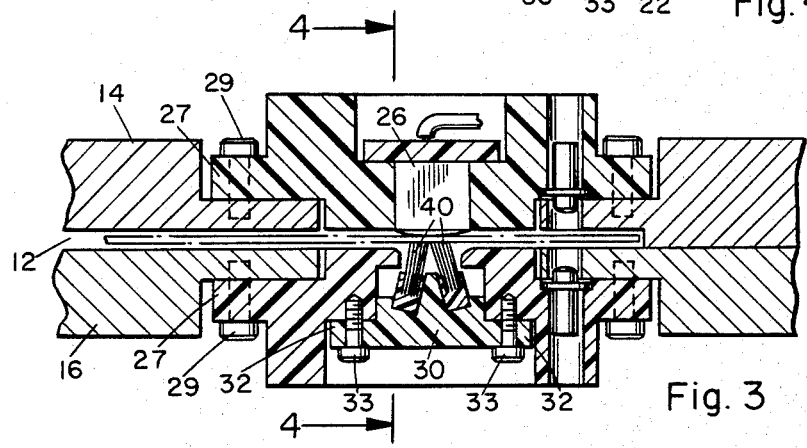
FIG. 3 is an enlarged sectional view taken on line 3—3 of FIG. 1.

Referring particularly to FIG. 5, a brush pressure unit designated generally by the numeral 28 comprising a generally rectangular mounting bracket 30 having oppositely directed mounting flanges 32 for attachment to member 24 by cap screws 33 or the like. One space of the mounting bracket is formed with a pair of sloped transverse brush mounting slots 34 and 36 separated by a generally triangular wall portion. A pair of identical brush units, each comprising a holder 38 and a plurality of bristles 40 are mounted within the brush holder or bracket 30 and are angled slightly toward one another. These brush units are mounted as shown in FIGS. 2 and 3 to apply a balanced force to the face of a card or ticket. The longitudinal (long) axis of the brush units are generally parallel to the direction of travel of the ticket.

The ticket travels toward and away from the plane of the paper as seen in FIG. 3. As can be seen from FIG. 3, the brushes are inclined toward one another at an angle somewhere between about 10° and 35° to a line perpendicular to the magnetic head. This would place the bristles at an angle from about 55° to about 80° to the ticket passage. The brush units have a longitudinal axis that generally extends parallel to the direction of movement or travel of the ticket.

In the illustrated arrangement, each magnetic head unit includes a magnetic read/write unit 26 mounted within the housing 24 adjacent a pressure brush unit 28. One magnetic read/write head is mounted in the lower portion or plate of the housing extending upward to the ticket passage 12 as illustrated in FIG. 4 and the other magnetic head assembly is mounted in the upper plate positioned directly opposite the first magnetic head assembly with each of the pressure brush units 28 positioned directly opposite the magnetic head unit 26.

As can be appreciated when viewing FIGS. 2 and 4, as a ticket or fare card passes along the passage 12, it first engages the bristles at the end of the brush units most near the direction from which the card is traveling. The bristles angle slightly around an axis extending in the direction of the card travel (FIG. 3) and apply pressure from both sides of a line along the direction of travel. The card then passes over the ends of the bristles which are normally pointing transverse to the direction of travel. The bristles engage the surface of a fare card and bias from two directions against the surface of the card.

It has been found that this arrangement provides an excellent means for applying pressure for biasing the fare card against the read/write head in either direction of movement with a uniform balanced pressure being applied by the brush pressure unit to the fare card. The brush pressure unit in accordance with the invention is also somewhat self-adjusting in pressure and is not as susceptible to tolerance problems due to wear as some other arrangements such as roller arrangements and the like. The combination of the brushes positioned parallel and side by side work to permit the fare card to pass in either direction with the brushes cooperating to engage and bias the fare card into engagement with the head without interfering with the passage thereof or the speed thereof.

In operation, as a card passes a read/write head 26 it is biased against the head by a brush pressure unit 28 of two brush units with two sets of bristles 40 engaging the face of the card. Since the card runs along the longitudinal axis of the brushes, the pressure on the card is substantially identical with either direction of travel.

While I have illustrated and described my invention by means of specific embodiments, it is to be understood that numerous changes and modifications may be made therein without departing from the spirit and scope of the invention as defined in the appended claims.

I claim:
1. A ticket read/write head assembly comprising:
a transducer;
means for transporting a ticket back and forth past said transducer in opposite directions along a path; and
bi-directional pressure brush means positioned adjacent said transducer for biasing a ticket against said transducer with uniform pressure during movement in either of said opposite directions.

2. The ticket read/write head assembly of claim 1 wherein:
said bi-directional pressure brush assembly comprises first and second rows of brush bristles directed toward said transducer and inclined toward one another.

3. The ticket read/write head assembly of claim 1 wherein:
said bi-directional pressure brush assembly comprises first and second rows of brush bristles extending transverse to said path and directed at different angles toward said transducer.

4. The ticket read/write head assembly of claim 2 wherein:
said brushes are each inclined at an angle of between about 10° and 35° from perpendicular to said path.

5. The ticket read/write head assembly of claim 3 wherein:
said brushes are directly at an angle of less than 90° to said path.

6. The ticket read/write head assembly of claim 1 wherein:
said path is defined by upper and lower guide plates.

7. The ticket read/write head assembly of claim 6 wherein:
said transformer is mounted on one of said guide plates; and
said brushes are mounted on the other of said plates.

8. The ticket read/write head assembly of claim 7 further comprising:
a second transducer and a set of pressure brushes mounted on said guide plates.

9. A ticket read/write head assembly comprising:
a pair of opposed plates defining a ticket passage;
a transducer mounted on one of said plates adjacent said passage;
means for transporting a ticket back and forth past said head in opposite directions along said passage; and
bi-directional pressure brush means positioned opposite said transducer for biasing a ticket against said transducer with uniform pressure during movement in either direction along said passage.

10. The ticket read/write head assembly of claim 9 wherein:
said bi-directional pressure brush assembly comprises first and second rows of brush bristles directed toward said transducer and inclined toward one another.

11. The ticket read/write head assembly of claim 9 wherein:
said bi-directional pressure brush assembly comprises first and second rows of brush bristles extending generally parallel to and said bristles extending transverse to said path at angles of between about 55° and about 80° to said passage.

12. The ticket read/write head assembly of claim 11 wherein:
said brushes have a longitudinal axis that extends parallel to said passage.

* * * * *